United States Patent
Yamamoto et al.

[11] Patent Number: 6,029,193
[45] Date of Patent: Feb. 22, 2000

[54] DATA SENDING/RECEIVING SYSTEM, DATA BROADCASTING METHOD AND DATA RECEIVING APPARATUS FOR TELEVISION BROADCASTING

[75] Inventors: Sozo Yamamoto; Michinori Masuda, both of Osaka, Japan

[73] Assignee: Matsushita Electric Industrial Co., Ltd., Japan

[21] Appl. No.: 08/881,124

[22] Filed: Jun. 24, 1997

[30] Foreign Application Priority Data

Jun. 25, 1996 [JP] Japan .................................... 8-164829
Jun. 25, 1996 [JP] Japan .................................... 8-164830

[51] Int. Cl.⁷ .............................. H04N 7/10; H04N 7/14
[52] U.S. Cl. ............................ 709/217; 348/12; 348/13; 348/10; 455/6.3; 455/5.1; 455/4.2
[58] Field of Search .............................. 709/217; 348/12, 348/13, 10, 6, 7; 455/6.3, 5.1, 4.2, 4.1, 3.2, 3.1, 428, 445; H04N 7/10, 7/14; H04M 1/00, 1/14

[56] References Cited

U.S. PATENT DOCUMENTS

| | | | |
|---|---|---|---|
| 5,323,394 | 6/1994 | Perlman | 370/85.15 |
| 5,557,320 | 9/1996 | Krebs | 348/12 |
| 5,589,892 | 12/1996 | Knee et al. | 348/906 |
| 5,790,541 | 8/1998 | Patrick et al. | 370/392 |
| 5,841,971 | 11/1998 | Longginout et al. | 395/200.3 |
| 5,878,403 | 3/1999 | DeFrancesco et al. | 705/38 |

FOREIGN PATENT DOCUMENTS 8-022471  1/1996  Japan .
8-032534  2/1996  Japan .

*Primary Examiner*—Nathan Flynn
*Assistant Examiner*—Vivek Srivastava
*Attorney, Agent, or Firm*—Parkhurst & Wendel, L.L.P.

[57] ABSTRACT

A data sending/receiving system with which a data user receives data provided through a data provider by a data receiving apparatus via one of a computer network line and a broadcasting, has a construction where a provider that provides data via a broadcasting, broadcasts (i) as to a data provided via a broadcasting, information about a broadcast channel and a broadcast time of the data related to its identifier, as additional information, and (ii) as to a data provided via a computer network line, a description of a location of the data related to the identifier, on a computer network; and a provider that provides data via a computer network line sends on a computer network line (iii) as to a data provided via a computer network line, a description of a location of the data related to its identifier on a computer network line, and (vi) as to a data provided via a broadcasting, information about the provider of the data. Thus data users can obtain data efficiently by utilizing a plurality of transfer media differ in type, and data providers can utilize transfer media efficiently.

2 Claims, 11 Drawing Sheets

Fig.1 (a)
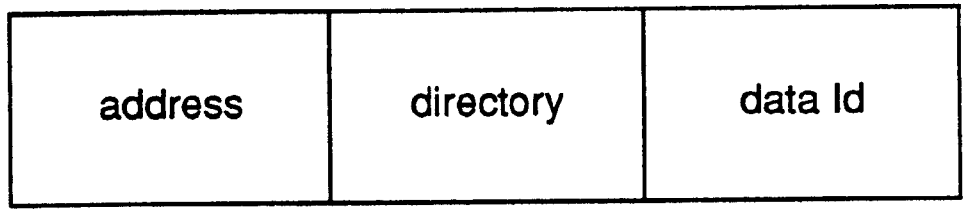
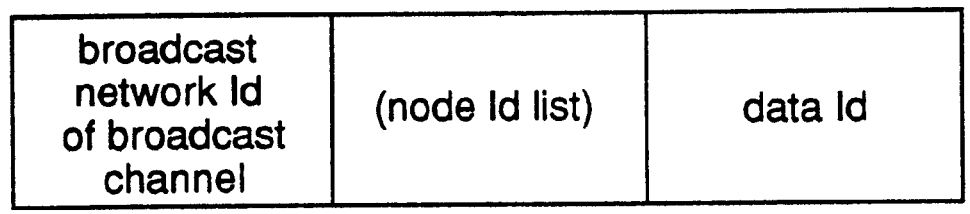
Fig.1 (b)
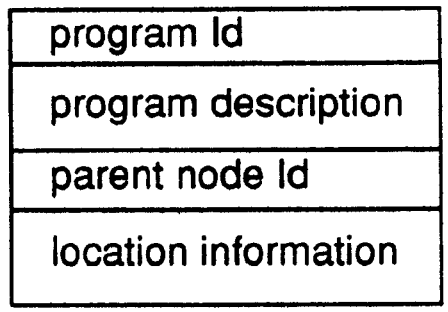
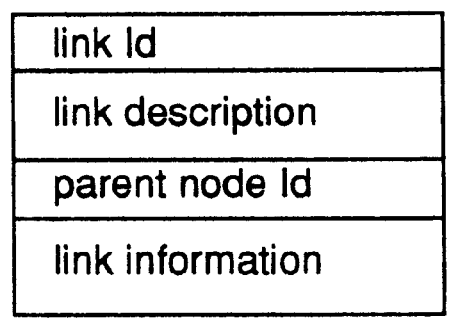

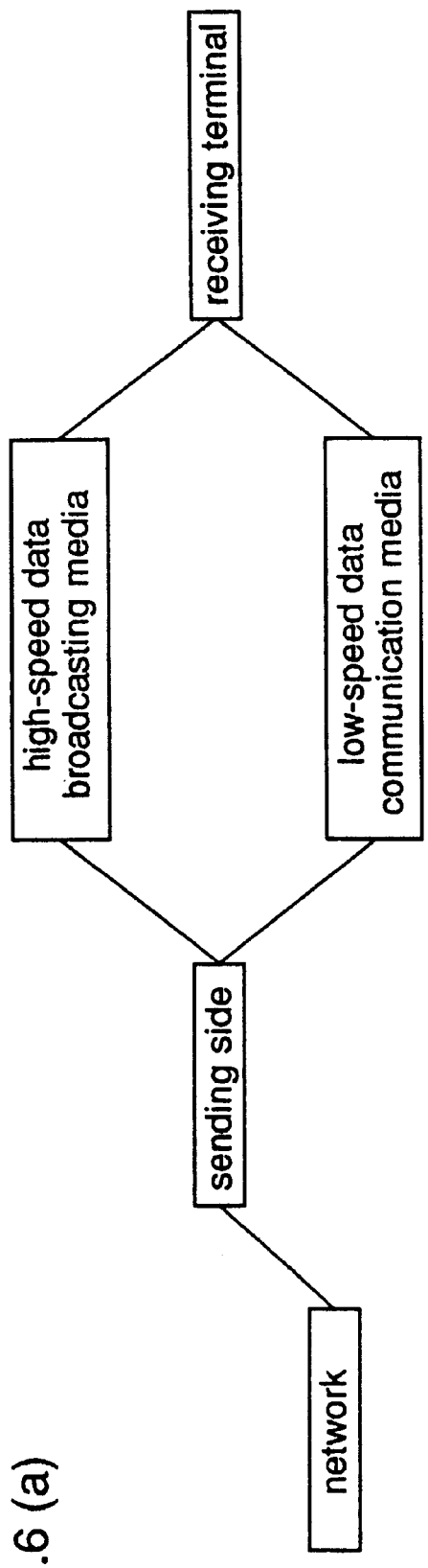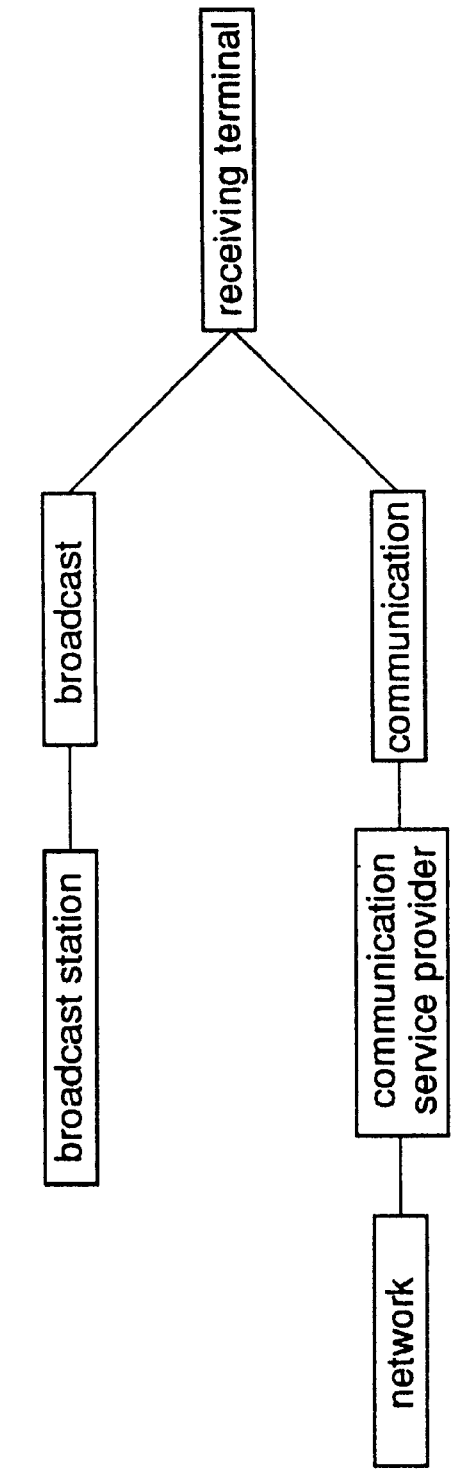
Fig.6 (a)
Fig.6 (b)

Fig.7 (a)

| node description 1 |
| node description 2 |
| node description 3 |
| ⋮ |
| program description 1 |
| program description 2 |
| program description 3 |
| ⋮ |

Fig.7 (b)

| node Id |
| node description | ← { node name, node explanation, key word, reference information, etc.
| parent node Id |
| number of child node Ids |
| child node Id list |
| ⋮ |

Fig.7 (c)

| program Id |
| program description | ← { program name, program explanation, key word, data type, data size, etc.
| parent node Id |
| location information | ← { broadcast channel, time information, (cycle, offset, cycle origin)

Fig.9

| art | | | |
|---|---|---|---|
| • picture<br>• sculpture<br>• literature<br>• music | | | |
| to host node | relation | previous page | next page |

DATA SENDING/RECEIVING SYSTEM, DATA BROADCASTING METHOD AND DATA RECEIVING APPARATUS FOR TELEVISION BROADCASTING

FIELD OF THE INVENTION

The present invention relates to a data sending/receiving system with which a data sent from a data provider is received by a receiver on a data user end, and, to a data receiving apparatus used in the data sending/receiving system. The invention also relates to a data broadcasting method for television broadcasting with which a data program is multiplexed into a normal television program for broadcasting, and, to a data receiving apparatus for receiving a data broadcasting that is broadcasted by the data broadcasting method.

BACKGROUND OF THE INVENTION

As a system for transferring data to be provided by a data provider to a user, there are a system in which a provider provides data for a user's device through a public telephone line, depending on the user's access, (e.g., networks using, for example, a personal computer), and data broadcasting systems that send data information by multiplexing it into a normal program in a television broadcasting.

In a data broadcasting for television broadcasting, there has been proposed a system in which, from a broadcasting station, hyper media data equivalent to data provided by a computer network is multiplexed into a broadcasting data and then sent it, so that a user obtains information equivalent to that obtained by a connection to a wide computer network, by receiving broadcast waves via a television receiver.

Although a sending via a broadcasting is performed by high-speed and at low cost, it is not performed according to an individual user's demand, and it is impossible to send all of a large amount of data acquired across the entire computer network.

On the other hand, data access by a network connection has a problem that its communication cost is high.

As a prior art broadcast providing system, Japanese Patent Published Application No. 8-32534(1996) discloses a system with which a given data is efficiently provided for a user at low cost. Specifically, data provided by a plurality of data (information) providers are concentrated on a service providing center, in which then, from several information transfer networks, one is selected depending on the type of a data to be provided. In cases where a large amount of data (information) is provided for a user, and data is provided for an unspecified user, data is sent via a high-speed information transfer network (e.g., information transfer networks utilizing a broadcasting satellite or a communication satellite, ground waves, CATVs). In cases where a relatively small amount of data is provided, and data is provided for a specified user, data is sent via a low-speed information transfer network (e.g., a public communication line, such as a public telephone line).

In this system, since a certain data is sent via a high- or low-speed information transfer network according to its data type, a user can obtain a specified data via one of plural information transfer networks. However, it is impossible to know the origin of data that is information from a computer network line and provided via a broadcasting, and to know the origin of data that is provided from information via a broadcasting, through a computer network line. Therefore, this system is inconvenient for obtaining a desired data.

Further, this publication has no description as to whether an identical data can be obtained under a different condition, i.e., from both high- and low-speed information transfer networks. Presently, there exists no data receiving apparatus for receiving data efficiently when providing an identical data via both a computer network line and a television broadcasting.

Meanwhile, broadcasting contents of a television or a radio are captured as a program, and are constructed according to channel and time. Additional information for describing content and construction of a program is also constructed by a table according to channel and time, although a genre code appending and a grouping of programs having an identical category have been proposed (see *Practice MPEG Text by Point Picture Style*, supervised by Hiroshi Fujiwara, issued by Kabushikikaisha Asuki).

Examples of data broadcasting that broadcast a data program by multiplexing it into a normal television program, includes one in which a data to be broadcasted is systematically arranged; a common header is appended to related plural data; and a common host header is appended to plural headers for preparing a hierarchical structure, whereby information of the hierarchical structure is broadcasted together with the data.

Since a prior art broadcasting method in which additional information related to programs is sent by multiplexing it to the program, is directed to send additional information whose main content is a program order according to time, such information is effective for selecting a normal television program. However, if a desired program is a data program, referential and hierarchical relationships between programs are unknown, making it impossible for a user to efficiently perform a retrieval and a selective acquisition of a data program.

In a prior art teletext, information of a hierarchical structure is broadcasted by appending an index to each data, and then appending a common index to plural indexes. For example, Japanese Patent Published Application No. 8-22471 (1996) discloses to append an index to an image data and then append a common index to plural indexes, whereby a hierarchical structure is prepared for data whose final data is an image, and information of the hierarchical structure is then broadcasted together with the data. Such a data broadcasting method enables a user to readily obtain necessary information by tracing a hierarchical structure, depending on a header.

In this prior art data broadcasting method, an index is appended to a data itself and a hierarchical structure is represented using the index, on the assumption that an identical information is repeatedly sent in a given short cycle through a given channel. For recognizing the entire hierarchical structure on a receiver end, it is necessary to receive all the final data. Thus, a final data size should be limited, and this method is unsuitable to a data broadcasting in which a final data is sent across plural channels for a long irregular cycle.

SUMMARY OF THE INVENTION

It is an object of the present invention to provide data sending/receiving system that performs effective data sending/receiving by complexly utilizing transfer media differ in type.

It is another object of the invention to provide a data receiving apparatus used in the data sending/receiving system.

It is further objet of the invention to provide a data broadcasting method for television broadcasting with which a user effectively retrieves and obtains data when a data program itself is sent across plural channels for a long irregular cycle.

It is further object of the invention to provide a data receiving apparatus with which a data broadcasting that is broadcasted by the data broadcasting method is received, leading to an easy data retrieval and acquisition.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to one aspect the present invention, in a data sending/receiving system in which a data user receives data provided through a data provider by a receiving apparatus via a computer network line or a broadcasting, (i) a provider that provides data via a broadcasting, broadcasts, as to data provided via a broadcasting, information about a broadcast channel and broadcast time of the data related to its identifier, as additional information; and broadcasts, as to data provided via a computer network line, a description about a location of the data related to the identifier on a computer network, and (ii) a provider that provides data via a computer network line sends on a computer network line, as to data provided via a computer network line, a description about a location of the data related to the identifier on a computer network line; and sends on a computer network line, as to data provided via a broadcasting, information about the provider of the data related to the identifier.

This enables a data user to obtain data efficiently utilizing a plurality of transfer media differ in type, and a data provider to use transfer media efficiently.

According to a second aspect, a data receiving apparatus capable of receiving data provided by a data provider, via a computer network line or a broadcasting, the apparatus comprises (i) cost calculation means for receiving, via a broadcasting, a description about a location on a computer network and a size of a data related to its identifier, the location and the data size being information about data provided via a computer network line, the description being broadcasted by a data provider that provides data via a broadcasting, and calculating a communication cost required in obtaining the data via a computer network line, based on the location and the data size; (ii) time calculation means for receiving information about a broadcast channel and broadcast time of a data related to its identifier, both being additional information for data identical with data provided via the computer network line, the information being broadcasted by a data provider that provides data via a broadcasting, and calculating time required in obtaining the data via a broadcasting, based on the additional information; and (iii) data receiving path decision means for deciding whether the data is obtained via a computer network line or a broadcasting, based on the communication cost and the time required.

This enables a data user to obtain data more efficiently by utilizing a plurality of transfer media differ in type, thereby easing a burden of obtaining data.

According to a third aspect, the data receiving apparatus of the second aspect has a feature that said data receiving path decision means decides a data receiving path with a data user on interactive basis.

This also enables a data user to obtain data more efficiently by utilizing a plurality of transfer media differ in type, thereby reducing a burden of obtaining data.

According to a fourth aspect, a data broadcasting method for a television broadcasting that broadcasts a data program by multiplexing it to a normal television program, comprises (A) setting a common host item for a plurality of data programs, to create a hierarchical structure; and (B) multiplexing, as additional information, (i) a program description including a location information that designates a broadcast channel and time of each data program related to its identifier, and information about a hierarchical relationship between each data program and the host item, and (ii) a node description including information about a hierarchical relationship between each data program and the host item related to its identifier, into a data program, followed by broadcasting.

It is thus possible to realize a data broadcasting for television broadcasting with which a data user retrieves data efficiently to readily obtain a desired data among a great amount of data, when sending a data program itself across a plurality of channels for a long irregular cycle.

According to a fifth aspect, the data broadcasting method of the fourth aspect has features that a plurality of program descriptions and node descriptions are divided into a plurality of groups, according to a distance between nodes in the hierarchical structure; and that information about to which group each program description and each node description belong, is multiplexed into a data program.

It is thus possible to realize a data broadcasting for television broadcasting with which a data user retrieves data efficiently to obtain data by treating, as a group, nodes having a similar distance between nodes in a hierarchical structure.

According to a sixth aspect, a data receiving apparatus for receiving a data broadcasting broadcasted by a data broadcasting method for a television broadcasting in which a data program multiplexed into a normal television program is broadcasted by setting a common host item for a plurality of data programs, to create a hierarchical structure, and multiplexing, as additional information, (i) a program description including a location information that designates a broadcast channel and broadcast time of each data program related to its identifier, and information about a hierarchical relationship between each data program and the host item, and (ii) a node description including information about a hierarchical relationship between each data program and the host item related to its identifier, into a data program, followed by broadcasting, includes (A) selection menu creating/displaying means in which, based on the node description and program description, an item selection menu screen capable of selecting one from host items, or a program selection menu screen capable of selecting one from data programs, is created and then displayed on a display screen; and (B) data program receiving/displaying means in which a data program selected from the program selection menu screen is received via a broadcasting, based on the location information related to the data program, and then displayed on a display screen.

This enables a data user to readily retrieve and obtain a desired data among a great amount of data by tracing a hierarchical structure, by selecting an item and a data (program) while viewing a selection menu screen.

According to a seventh aspect, the data receiving apparatus of the sixth aspect has a feature that said selection menu creating/displaying means divides the program descriptions and node descriptions into a plurality of groups according to a distance between nodes in the hierarchical structure, to create a selection menu for each group.

This enables to readily retrieve and obtain a desired data among a great amount of data by tracing a hierarchical structure, by selecting an item and a data (program) while viewing a selection menu screen that is prepared by classifying, into a group, nodes having a similar distance between nodes in a hierarchical structure.

BRIEF DESCRIPTION OF THE DRAWINGS

FIGS. 1(a) and 1(b) are diagrams illustrating descriptions of data provided, which are sent from a data provider in a data sending/receiving system of a first embodiment of the present invention.

FIGS. 6(a) and 6(b) are diagrams illustrating a structure of an information transfer network between a data provider and a user's terminal, which is constructed by a data sending/receiving system of the first embodiment.

FIGS. 7(a) to 7(c) illustrate additional information that is multiplexed into broadcasting signals as to a data provided via a broadcasting in a data sending/receiving system of the first embodiment, and illustrate additional information related to a data (program) that is multiplexed into a data (program) for broadcasting in a data broadcasting method of a second embodiment.

FIG. 9 illustrates a selection menu screen on a display screen displayed by a receiving apparatus for receiving a data broadcasting in a data sending/receiving system of the first embodiment, and illustrates a selection menu screen on a display screen displayed by a receiving apparatus for receiving a data broadcasting that is broadcasted by a data broadcasting method of the second embodiment.

DETAILED DESCRIPTION OF THE PREFERRED EMBODIMENTS

Embodiment 1

A data sending/receiving system according to a first embodiment is applicable to a single data provider (sending end), as shown in FIG. 6(a), and a plurality of providers comprising a broadcasting station, a communication service provider and the like, as shown in FIG. 6(b). Examples of the single data provider include a case where a broadcasting station (a broadcast network) of a digital television broadcasting also has the function of a communication service provider for a computer network.

Figure 5:
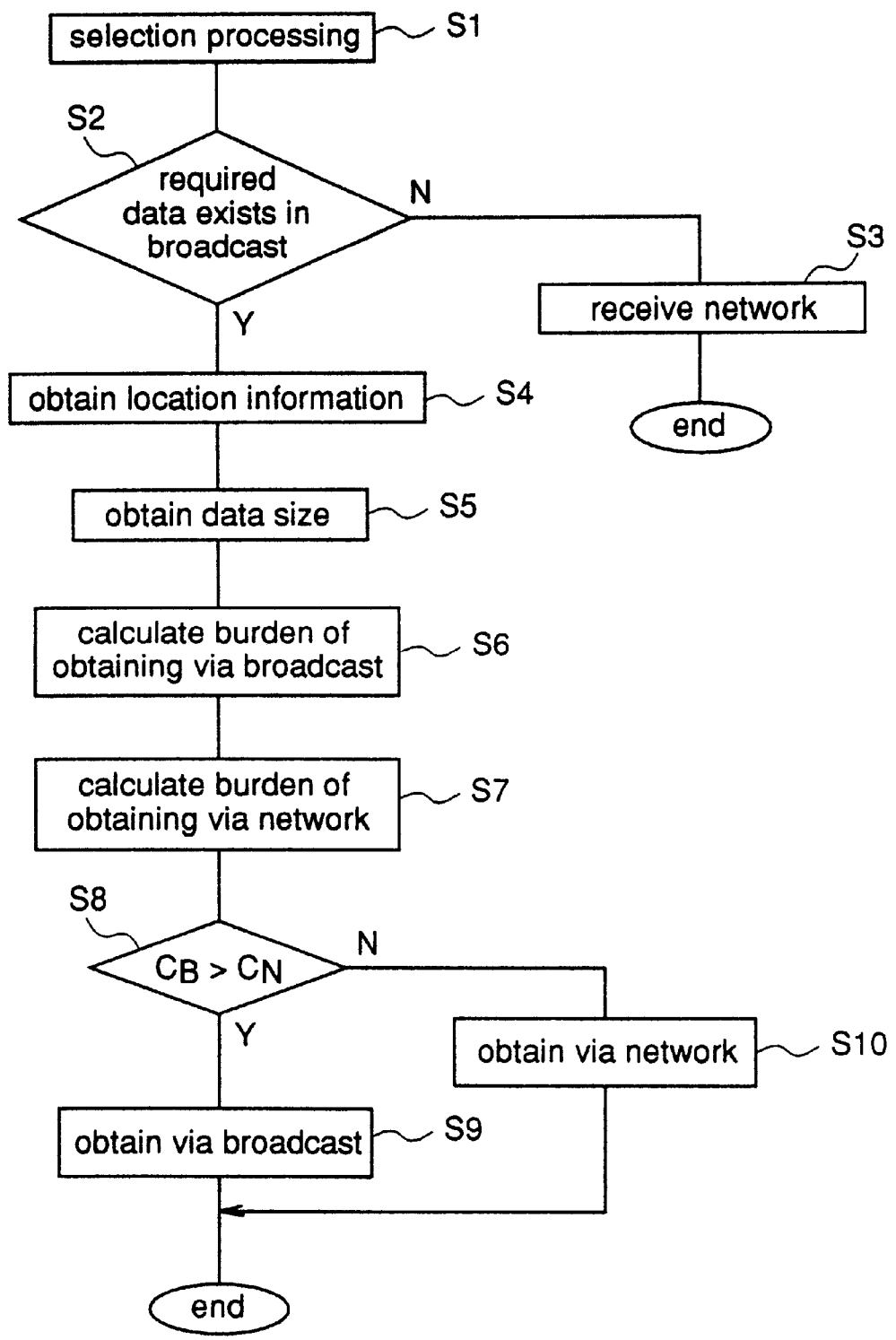
FIG. 5 is a still another flow chart of an operation flow of a data sending/receiving apparatus used in a data sending/receiving system of the first embodiment.

Throughout the following description, a data provider that provides data via a computer network line (e.g., public telephone line) is referred to as a "communication data provider", and a data provider that provides data via a digital television broadcasting refers to as a "broadcasting data provider." In an embodiment shown in FIG. 5, a communication data provider is identical with a broadcasting data provider.

FIG. 1(a) shows descriptions of data location which are sent from a communication data provider via a computer network (e.g., a public telephone line) in a data sending/receiving system of this embodiment. In FIG. 1(a), an upper diagram shows a description of a data location of data provided via a computer network line, on a computer network; and a lower diagram shows a location information of a data program provided via a digital television broadcasting, on a broadcasting, i.e., information on through which channel of which broadcast network is provided.

FIG. 1(b) shows descriptions of additional information of data which is sent from a broadcasting data provider, by multiplexing it into a normal program or a data program in a digital television broadcasting. In FIG. 1(b), an upper diagram shows an additional information description (a program description) of a data program provided via a digital television broadcasting; and a lower diagram shows an additional information description including a data location description on a computer network of a data provided via a computer network line.

Description of a data location on a network, as shown in the upper diagram of FIG. 1(a), includes a telephone number indicating an address or an access point on a computer network to which connection is desired; a directory that indicates a hierarchy of data in descending order; and an Id of a data, an Id of a link, or an Id indicating a file name.

Description of an additional information with respect to a data program, as shown in the upper diagram of FIG. 1(b), includes a program description indicating an Id of a data (referred to as a "data program" or "program"), the program name of the data program, a program explanation, a key word, a data type, a data size; a parent node Id indicating to which layer of a hierarchical structure the data program belongs; and a location information of the program indicating a broadcast channel and time information. As such time information, there are described a cycle origin, cycle, and offset time indicating a difference between the origin and a real broadcast time, when a data program is broadcasted in a given cycle.

FIGS. 7(a) to 7(c) illustrate additional information that is multiplexed into broadcasting signals when broadcasting, with respect to a data provided via a broadcasting, in a data sending/receiving system of this embodiment. In a data broadcasting via a digital television broadcasting in this system, data provided is arranged hierarchically according to type, and information indicating its hierarchical structure and interaction is multiplexed when broadcasting, as additional information of a data program.

FIG. 7(a) shows such additional information which includes a node description indicating the content of position (node) in the middle of a hierarchical structure and a relationship between the node and another node; and a program description indicating the content of a data (program) of a real data located at a least significant node in the hierarchical structure, and a location information of the data (program), on a broadcasting.

FIG. 7(b) shows a construction of a node description which includes a node Id for identifying a node, a node description column, a node name, a node explanation, a key word, reference destination information, etc; a parent node Id indicating the next higher node; the number of child node Ids indicating the number of the next lower nodes; and a list of the child node Ids.

FIG. 7(c) shows a construction of a program description which includes a program Id for identifying a data (program); a data description column indicating a program name, a program explanation, a key word, a data type, a data size, etc; a parent node Id indicating the next higher node for the aforesaid program; and a location information of a data program indicating a broadcasting channel and time information. As such time information, there are described a cycle origin, a cycle, and offset time indicating a difference between the origin and a real broadcast time, when a data program is broadcasted in a given cycle. From "time information," it is possible to know an expected value (minimum waiting time) until a user obtains a desired data. From "cycle", "cycle origin" and "offset time" information, it is possible to know time when a user obtains a desired data via a broadcasting. See additional information description in the upper diagram of FIG. 1(b).

FIG. 8(a) shows a hierarchical structure of data provided via a broadcasting, in a data sending/receiving system of this embodiment. In this figure, n1 is a root node (most significant node), and n2, n3 and n4 are child nodes of n1. The node n2 has child nodes n5, n6 and n7; and n4 has child nodes n11, n12 and n13. Each child node is a least significant node on which a data (program) is located. The node n3 has child nodes n8, n9 and n10, each having three child nodes n14, n15, n16; n17, n18, n19; and n20, n21, n22, respectively. Each child node is a least significant node on which a data (program) is located.

Description will be given of additional information that is sent in providing data by a hierarchical structure as shown in FIG. 8(a). For example, as a node description of n3, an Id for identifying n3 is described in a node Id column, and the node name of n3 is described in a node description column. In the node description column, there is described as reference destination information, for example, an Id of a node that is relative to n3, other than parent and child nodes. In the column of a parent node Id, there is described an Id for identifying n1 being a parent node of n3. In the column of the number of child node Id, "3" is described since there are three child nodes n8, n9 and n10. In the column of a child node Id list, there are described Ids for identifying n8, n9 and n10, respectively. For n5 to n7, n11 to n13, and n14 to n22, on each of which a data (program) is located, a program description as shown in FIG. 7(c) is given in place of a node description. These nodes are divided into segments according to a distance between nodes in a hierarchical structure and, per segment, additional information is obtained on a receiving device end, so that a menu for a selection operation is prepared and displayed.

The hierarchical structure shown in FIG. 8(a) is divided into segments surrounded by broken lines. Each segment is provided with a segment Id for identifying the segment, and descriptions of a node and a program are provided with a tag indicating into which segment the node and program are included. Additional information is gathered per segment and then sent in the form of, as shown in FIG. 8(b), a collection of a specific segment Id, and a node description and a program description corresponding to that segment. On a receiving end, it is possible to obtain a desired information only by obtaining necessary segments, without receiving and analyzing the entire additional information. FIG. 9 shows a menu screen displayed in a screen of a receiving device.

In a retrieval utilizing a menu, a hierarchical structure is retrieved based on a parentage and mutual reference relationship. Segment division according to a distance between nodes decreases the number of acquisitions of additional information across segments. If a move due to a retrieval is within a single segment, it is unnecessary to obtain again additional information. Only when moves to another segment, a segment to which a desired node belongs is obtained.

In a data sending/receiving system of this embodiment, when a data identical with that provided via a computer network line is also provided via a broadcasting, and when data to which reference is desired is data provided via a broadcasting, a communication data provider sends, via a communication network line, a description shown in the lower diagram of FIG. 1(a), as a location information of a data program provided with a digital television broadcasting, in other words, information that indicates through which channel of which broadcasting station (a broadcasting network) the data program is provided. As shown in the aforesaid diagram, an Id of a broadcasting station (a broadcasting network), and an Id of a broadcast channel are described in an address item, and an Id of a data (program) of a data program provided via a broadcasting is described in a data Id item. When a data identical with a data provided via a broadcasting is also provided via a network line, and when data to which reference is desired is data provided via a network line, a broadcasting data provider sends, via a broadcasting, an additional information description, as shown in the lower diagram of FIG. 1(b), which indicates an Id (link Id) of a data provided via a network line, and a location information of this data on a network. As such link information, there are described an address and a directory.

Figure 2:
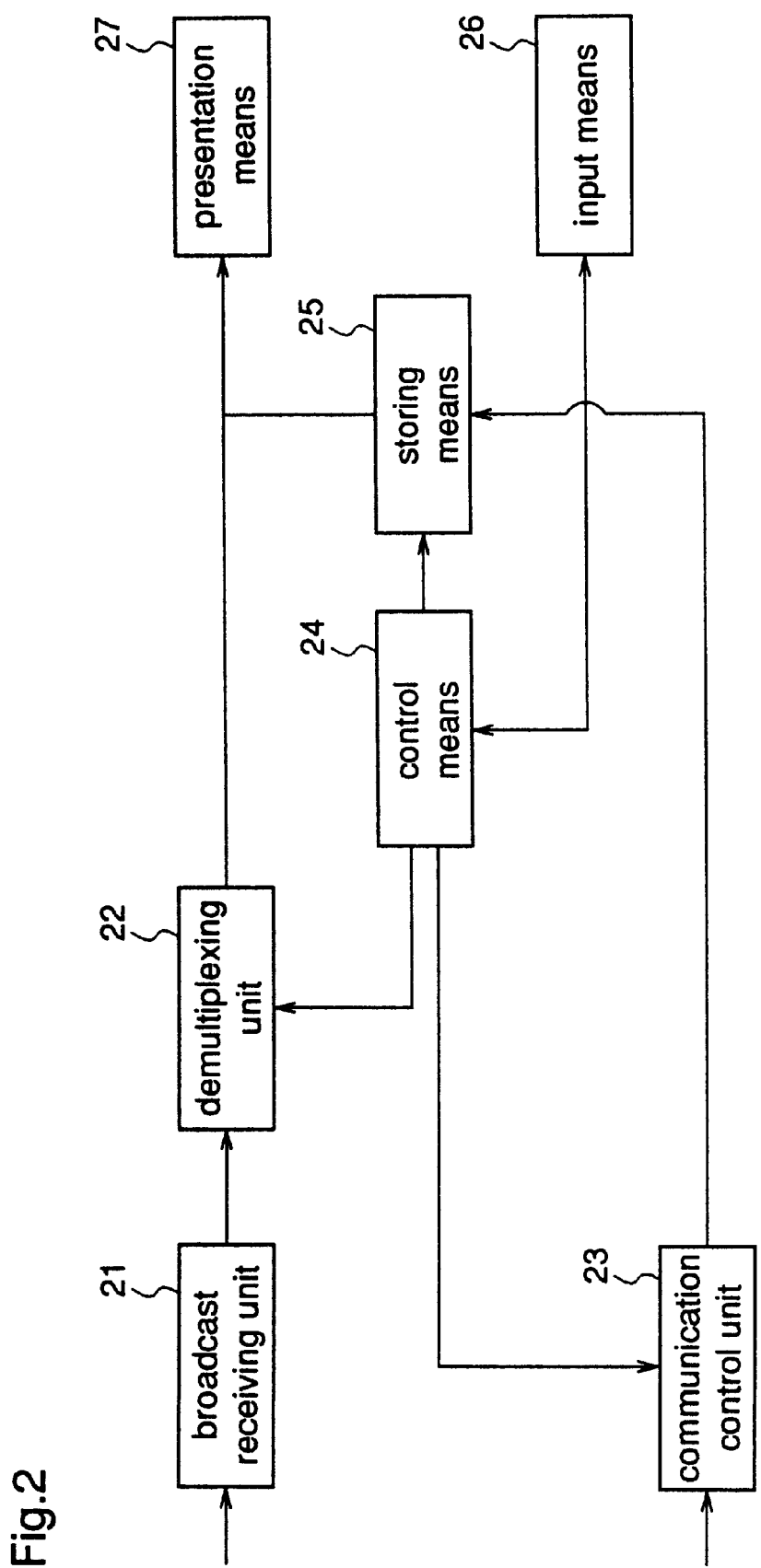
FIG. 2 is a diagram illustrating a construction of a data receiving apparatus used in a data sending/receiving system of the first embodiment.

FIG. 2 shows a construction of a data receiving apparatus used in a data sending/receiving system of this embodiment. A broadcast receiving unit 21 receives a digital television broadcasting. A demultiplexing unit 22 splits a multiplex signal received by the receiving unit 21, into normal program signals, data program signals and additional information signals. A communication control unit 23 performs communications, connected to a computer network via a public telephone line and the like. Storing means 25 stores additional information signals output from the demultiplexing unit 22, and data from the communication control unit 23, and the like. Presentation means 27 presents a program based on a normal program signal output from the demultiplexing unit 22, data based on a data program signal output from the demultiplexing unit 22, and a data menu prepared based on a storage content of the storing means 25. Control means 24 controls the demultiplexing unit 22, the communication control unit 23 and the storing means 25. The control means 24 stores an additional information signal output from the demultiplexing unit 22, in the storing means 25 and, based on the stored additional information signal and the like, prepares a data menu presented by the presentation means 27. The control means 24 also performs operations, such as a change of the content of a menu to be presented, according to an input from a data user through input means 26.

Figure 3:
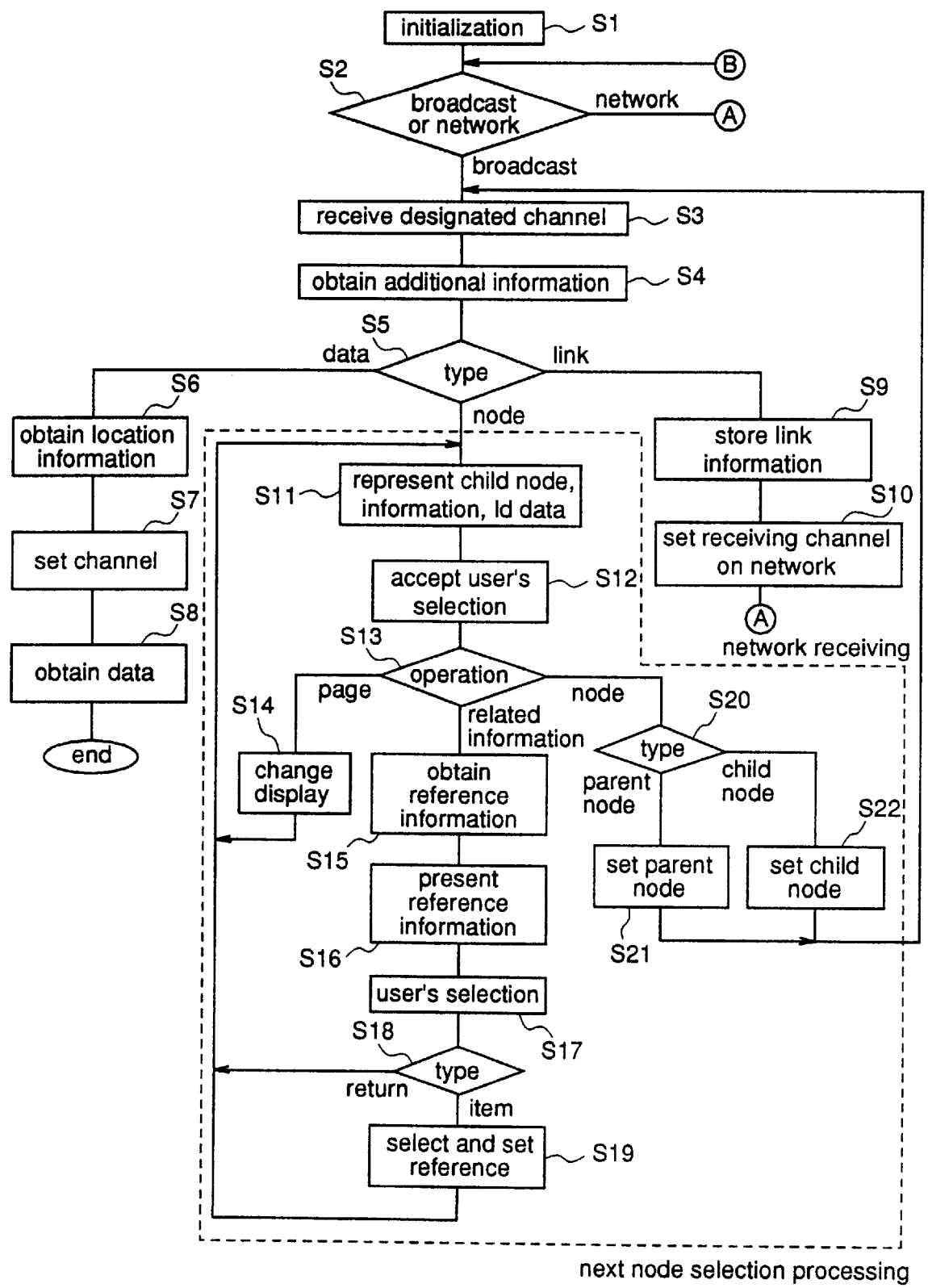
FIG. 3 is a flow chart illustrating an operation flow of a data receiving apparatus used in a data send/receiving system of the first embodiment.
Figure 4:
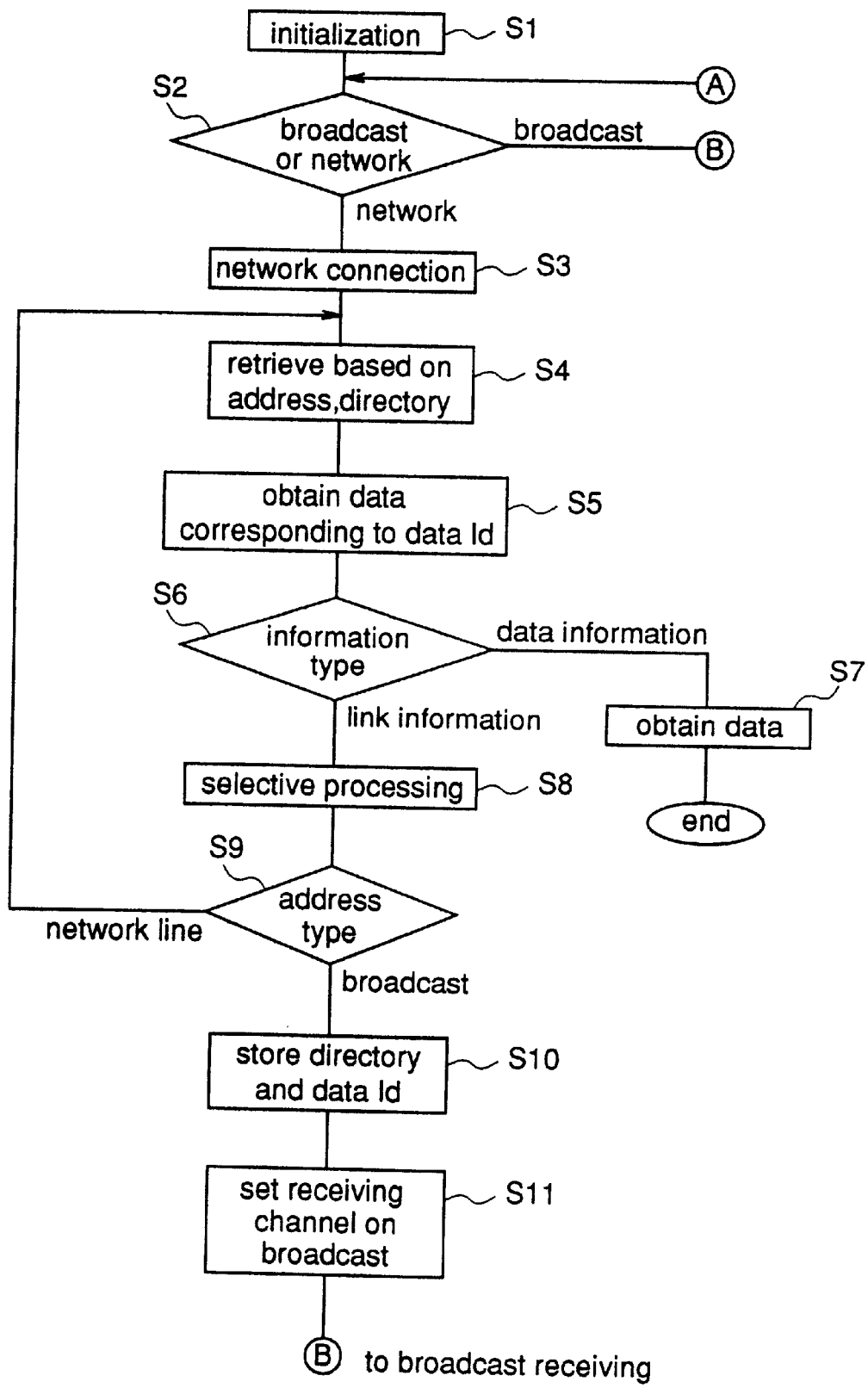
FIG. 4 is another flow chart of an operation flow of a data receiving apparatus used in a data sending/receiving system of the first embodiment.

FIGS. 3 to 5 show operation flows of a data receiving apparatus used in a data sending/receiving system of this embodiment.

Referring to FIG. 3, a flow of acquiring data via a broadcasting will be described. At step S1, a default receiving channel and a receiving channel decision criteria are set by designating an Id of a root node (most significant node) or a specific node, based on input from the input means 26, whereby an initialization is completed. At step S2, it is decided whether a channel of the initialization is for a broadcasting or network. For a broadcasting, a designated channel is received at step S3 and then additional information is obtained at step S4. For a network, there moves to a network receiving operation.

At step S5, it is decided whether the obtained additional information is a data (program) description, a node description or a link description. For a data (program) description, its location information is obtained at step S6 and, based on that information, a channel is set at step S7, and a data is obtained via a broadcasting at step S8, so that the operation is completed. For a link description, its link information is stored in the storing means 25 at step S9, a receiving channel is set on a network at step S10, thereby moving to a network receiving operation. For a node description, there moves to an operation for selecting a next node. In the next node selection, based on the node description, a menu indicating a list of child node Ids, as shown in FIG. 9, or a menu indicating a list of information Id data (a data program list) is displayed on the presentation means 27, at step S11, and then a user's input for selection is accepted at step S12.

At step S13, when a user's operation is a page change, there returns to step S11, so that another menu including lists which have not been displayed, is displayed on the presentation means 27.

When a user's operation is for requesting related information, reference destination information described in a node description column is obtained at step S15, and that information is displayed on the presentation means 27 at step S16, so that a user's input for selection is accepted at step S17. At step S18, after viewing the reference destination information displayed on the presentation means 27, if a user wishes to move to a node of a reference destination, the user selects one item from displaying reference destination information. If not, the user selects to release a display of the reference destination information at step S18, thus returning to step S11, so that the original menu is displayed. When an item is selected at step S18, a reference destination node Id is selected and then set at step S19, thus returning to step S11, so that a menu prepared based on a node description corresponding to the reference destination ode Id is displayed on the presentation means 27.

When a user's operation at step S13 is a node selection (i.e., a move to a host node), or a selection of an item in a list, there moves to step S20. When a selected node is a parent node (i.e., a host node), the parent node is set at step S21, thus returning to step S3. When a selected node is a child node (i.e., an item in a list), the selected child node is set at step S22, thus returning to step S3.

Therefore, data users can obtain a desired data via a broadcasting by tracing a hierarchical structure, by repeating the foregoing steps. When a desired data is one provided via a network line, it is possible to move to a network receiving operation.

Referring now to FIG. 4, a flow of acquiring data via a network line will be described. At step S2, it is decided whether a channel of an initialization at step S1 is for a broadcasting or network. For a broadcast channel, there moves to step S2 shown in FIG. 3. For a network channel, a network connection is performed at step S3 and, based on an address and a directory, a retrieval is performed at step S4, so that information corresponding to a data Id is obtained at step S5. At step S6, it is decided whether the obtained information is a data information or a link information. For a data information, a data is obtained at step S7, so that the operation is completed. For a link information, a user's operation for selection is accepted at step S8 and, based on a selected address to which link is desired, at step S9, it is decided whether the link information is data provided via a network line or broadcasting. For a data via a network line, there returns to step S4 and, based on address and directory, a retrieval is performed. For a data via a broadcasting, its directory and data Id are stored in the storing means 25 at step S10, and then a receiving channel is set on a broadcasting at step S11, thus moving to step S2 shown in FIG. 3. A data user obtains a desired data via a network line by repeating the foregoing steps. When a desired data is one provided via a broadcasting, it is possible to move to a broadcast receiving operation.

Referring to FIG. 5, there will be described a selection processing for obtaining data, when a specific information (data) is provided through both a broadcasting and a network line.

Selection processing is started at step S1. At step S2, it is decided whether a desired data is a data provided via a broadcasting at step S2. This is based on the following. Since additional information related to a data provided via a broadcasting is broadcasted at any time, it is able to decide whether a desired data is one provided via a broadcasting, by storing such additional information and then retrieving its storage content. If decided that a desired data at step S2 is not present in a broadcasting, a network is received to obtain data, thus completing the operation. If decided that a desired data is present on a broadcasting, a location information of the desired data is obtained at step S4, and its data size is obtained from its program description at step S5.

At step S6, a burden of acquiring data from a broadcasting is calculated. Time required for acquiring a desired data via a broadcasting, i.e., waiting time, is calculated based on an offset time indicating a difference between a real broadcast time, and an origin of data broadcasting cycle, cycle, and an origin. Thus, the burden is obtained from the following equation: CB=f(TB), wherein CB is a burden of acquiring data via a broadcasting, f is a predetermined coefficient, and TB is a waiting time.

At step S7, a burden of acquiring data from a network is calculated. A communication time is obtained by dividing the data size by a communication rate. Thus, the burden is obtained from the following equation: CN=g(TN, PN), wherein CN is a burden of acquiring data from a network, TN is a communication time, PN is connection and communication fare, and g is a predetermined gain coefficient (i.e., whenever an access is attempted, data is obtainable without waiting time).

At step S8, a comparison between CB and CN is made. When CB>CN, a broadcasting is received to obtain data at step S9, thus completing the operation. When CB<CN, a network is received to obtain data at step S10, thus completing the operation. Such a selection processing enables a user to efficiently obtain data in consideration of trade-off between a burden of acquiring data from a broadcasting and a burden of acquiring data from a network.

Although in the foregoing description, a data acquiring path is selected by calculating and comparing the burden from a broadcasting and from a network, based on a predetermined reference, it may be constructed that a user sets freely a preference between a communication cost and a waiting time, or a selection of data acquiring path is carried out on interactive basis.

Although this embodiment refers to a data broadcasting via a television broadcasting in which a data provided via the television broadcasting is arranged hierarchically according to its content, and its hierarchical information is sent via a broadcasting, as additional information of a data (program), a data sending/receiving system of this invention is applicable to one in which, as additional information of data provided via a broadcasting, only a broadcast channel of a data (program) and time information are sent via a broadcasting. In this case, there is no chance that the type of additional information is a node at step 35 in the data receiving flow via a broadcasting, as shown in FIG. 3. Accordingly, an operation for a data (program) or link information will be performed.

Embodiment 2

Referring again to FIGS. 7(*a*) to 7(*c*), there will be described additional information related to a data (program) that is multiplexed into a data (program) for broadcasting, in a data broadcasting method of a second embodiment. this method comprising arranging a data provided hierarchically according to its content, and multiplexing information indicating its hierarchical structure and interaction, as additional information of a data program, followed by broadcasting.

Descriptions of FIGS. 7(*a*) to 7(*c*) are omitted here.

On a receiving device end, from "cycle information," it is possible to know an expected value (minimum waiting time) until a user obtains a desired data. From "cycle", "cycle origin" and "offset time" information, a user can exactly know time when a desired data is obtained via a broadcasting.

When a data broadcasting utilizing a data broadcasting method of this embodiment, in which additional information as shown in FIGS. 7(*a*) to 7(*c*) is broadcasted, is received on a receiving device end, it is able to obtain data by that the receiving device receives, based on a location information of a program description, signals having a program identifier described in the program description, from a designated channel at a designated time.

In general, such additional information has less data amount than a program itself, enabling to shortening a sending cycle. Therefore, time required in acquiring data is short. Even when whole additional information is stored, its storing cost is small compared with that of the entire program.

Thus, in a data broadcasting method of this embodiment, information related to a hierarchical structure of a data program provided, and its location information are broadcasted as additional information, and therefore, the hierarchical structure is recognized only by receiving the additional information, without receiving the data program itself on a receiving device, so that a desired data program alone is selected and obtained. This enables to realize a data broadcasting on a television broadcasting in which a data user can retrieve data efficiently to obtain it, even when a data program itself is sent across plural channels for a long irregular cycle. Further, it is able to provide a variety of data, irrespective to the type and the size of a data program, because a data program itself is broadcasted apart from additional information.

Figure 8:
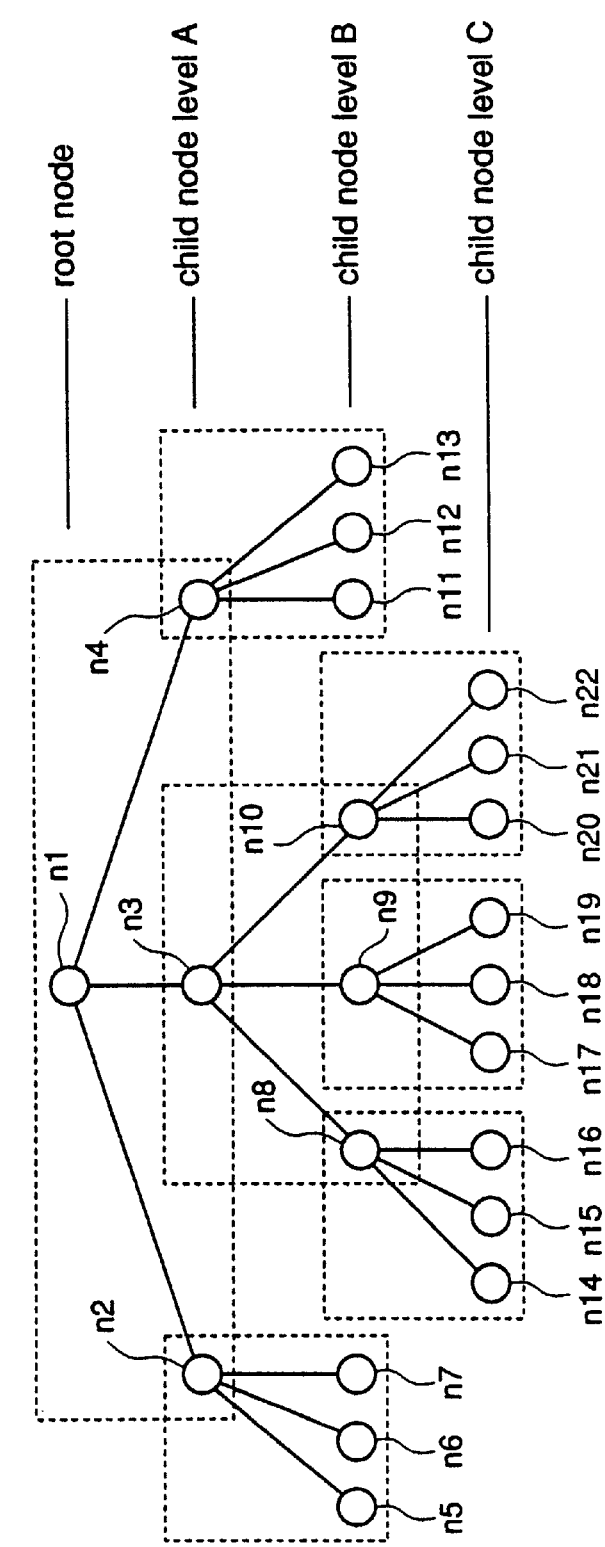
FIGS. 8(a) and 8(b) illustrate a hierarchical structure and a segment table of a data provided via a broadcasting, respectively, in a data sending/receiving system of the first embodiment, and show a hierarchical structure of a data provided via a broadcasting in a data broadcasting method of the second embodiment.

Descriptions of FIGS. 8(*a*) to 8(*c*) and 9 are omitted here.

Although in FIG. 8(*a*), segments are formed by gathering nodes having a difference between nodes by one level, nodes having a difference by two or more levels may be included therein.

Figure 10:
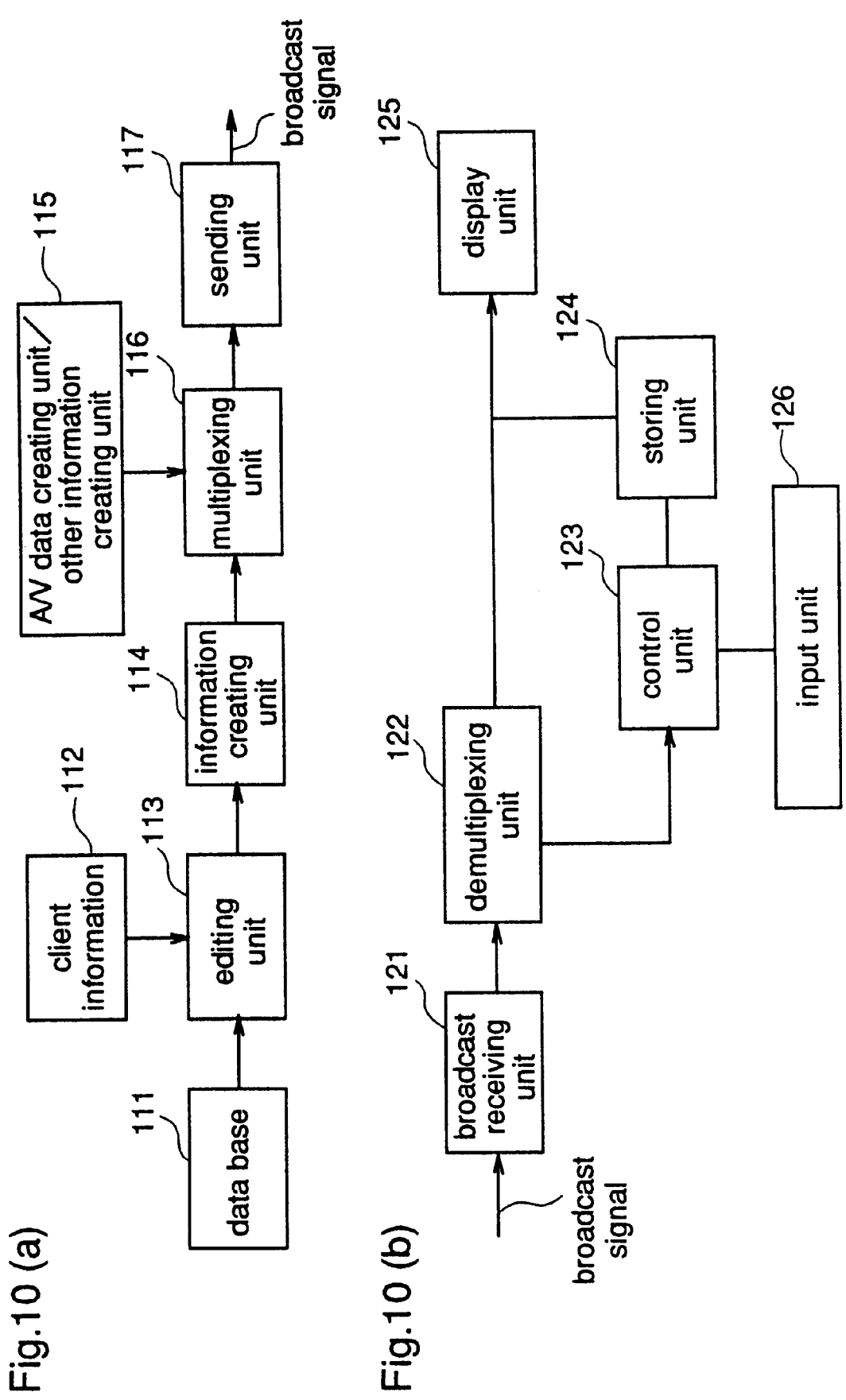
FIG. 10(a) illustrates a construction of a broadcasting station realizing a data broadcasting method of the second embodiment.
FIG. 10(b) illustrates a construction of a data receiving apparatus that receives a data broadcasting to be broadcasted by a data broadcasting method of the second embodiment.

FIG. 10(*a*) illustrates a construction of a broadcasting station that realizes a data broadcasting method of this embodiment. FIG. 10(*b*) illustrates a construction of a data receiving apparatus that receives a data broadcasting sent by a data broadcasting method of this embodiment.

Referring to FIG. 10(*a*), a database 111 stores various data. Client information 112 contains information about which data is desired by a data user. An editing unit 113 decides the significance of data stored in the database 111, based on the client information 112, classifies data into two groups: "data to be provided" and "data not be provided," and systemizing the former according to its content. In the editing unit 113, for example, a hierarchical structure shown in FIG. 8(*a*) is constructed. Information creating unit 114 creates a node description and a program description based on a hierarchical structure architecture in the editing unit 113, and alters a data to be provided into a program. A/V data creating unit/other information creating unit 115 creates A/V data of a normal television program and creates information other than information for data broadcasting. As such other information, there are program table information of a normal television program, and the like. A multiplexing unit 116 multiplexes a data program from the information creating unit 114, a program and additional information from the creating unit 115, to create a multiplex signal. A sending unit 117 sends a multiplex signal output from the multiplexing unit 116, as a television broadcasting signal.

Referring to FIG. 10(*b*), a broadcast receiving unit 121 receives a digital television broadcasting signal sent from the sending unit 117. A demultiplexing unit 122 splits a multiplex signal received by the receiving unit 121 into normal program signals, data program signals and additional information signals A storing unit 124 stores additional information signals output from the demultiplexing unit 122. A presentation unit 125 presents a program based on normal program signals output from the demultiplexing unit 122, presents a data based on data program signals output from the unit 122, and a menu of data created based on the content stored in the storing unit 124. A control unit 123 controls the demultiplexing unit 122 and the storing unit 124. The control unit 123 stores additional information signals output from the demultiplexing unit 122 in the storing unit 124 and, based on the stored additional information signals, creates a menu of data to be presented by the presentation unit 125. Further, the control unit 123 changes the content of a menu presented according to input from a user through an input unit 126, and the like.

Figure 11:
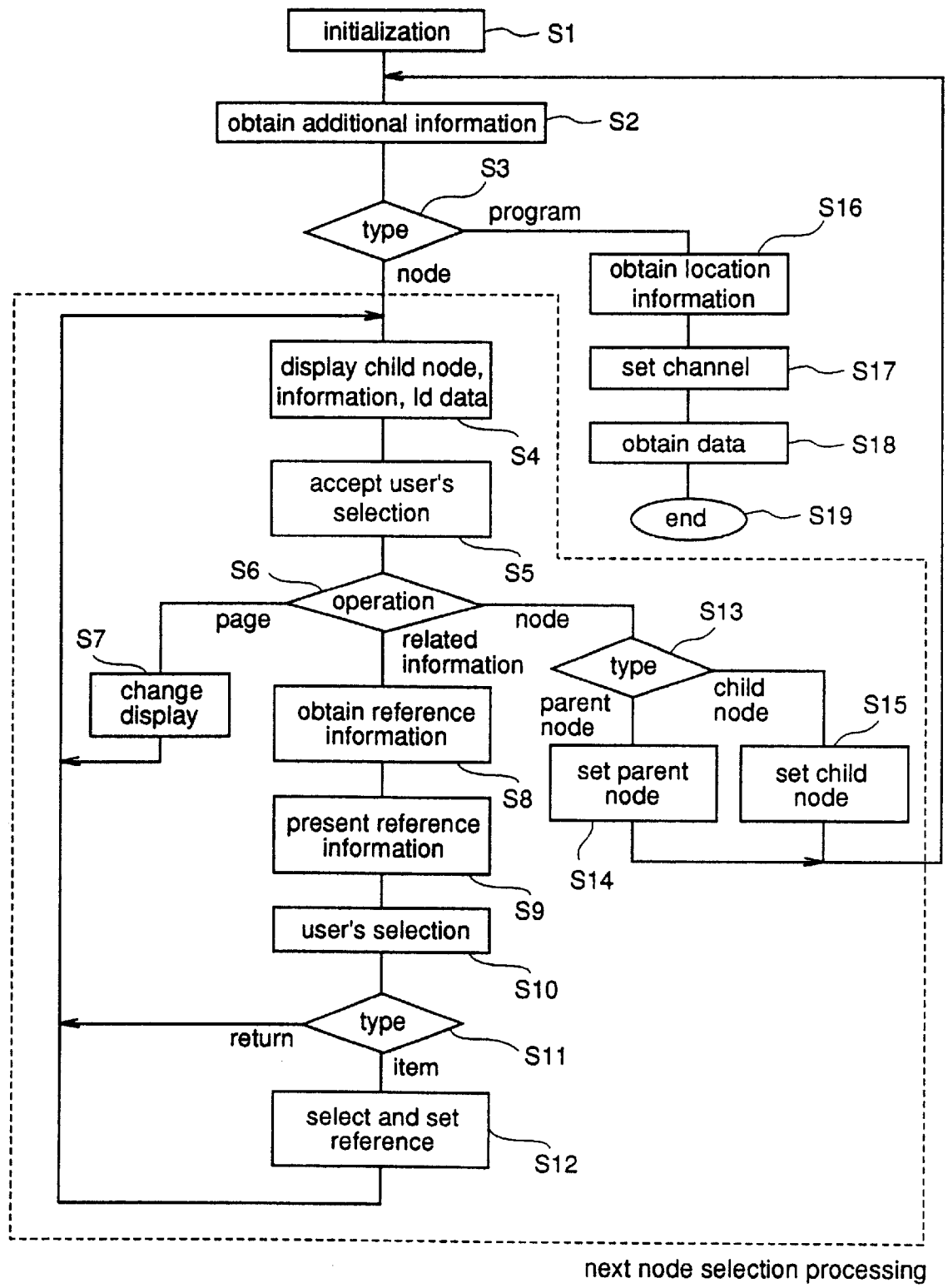
FIG. 11 is a flow chart showing an operation flow of a data receiving apparatus of the second embodiment.

FIG. 11 shows an operation flow of a data receiving apparatus of this embodiment.

At step S1, an initialization is conducted by designating an Id of a root node (most significant node) or a specific node, by an input or the like from the input unit 126. At step S2, a channel designated by the initialization is received to obtain additional information. At step S3, it is decided whether the obtained additional information is a data (program) description or a node description.

For a data (program) description, its location information is obtained at step S16. A channel is set based on the location information at step S17, and data is obtained from a broadcasting at step S18, so that the operation is completed at step S19.

On the other hand, for a node description, there moves to a next node selection processing. In this processing, a menu indicating a list of child node Ids as shown in FIG. 9, or a list of information Id data (data program list) is displayed, based on the node description, on the presentation unit 125 at step S4, and an input for selection from a user is accepted at step S5. When a selective operation of a user at step S6 is a page change, another menu including a list not yet displayed is displayed on the presentation unit 125 at step S7, thus returning to step S4. When a selection operation at step S6 is a demand for related information, a reference information descried in a node description column is obtained at step S8, and the reference information is displayed on the presentation unit 125 at step S10. If a user wishes to move to a node for reference after reviewing the reference information displayed on the presentation unit 125, the user selects one item from the reference information. On the other hand, if not wish so, the user select to release a display of reference information at step S11, thus returning to step S4, so that an original menu is displayed. When an item is selected at step S11, a reference node Id is selected and then set at step S12, thus returning to step S4. As a result, a menu that is created based on a node description corresponding to the reference node Id is displayed on the presentation unit 125.

When a selection operation of a user at step S6 is a node selection, i.e., a move to a host node, or a selection of item among a list, there moves to step S13. If selected a parent node, i.e., a move to a host node, the parent node is set at step S14, thus returning to step S2. If selected a child node, i.e., a selection of an item among a list, the selected child node is set at step S15, thus returning to step S2. Therefore, data users obtain a desired data via a broadcasting by tracing a hierarchical structure, by repeating the foregoing steps.

What is claimed is:

1. A data broadcast method for a television broadcast with which a data program is multiplexed into a normal television program for broadcasting, comprising:

setting a common host item for a plurality of data programs to create a hierarchical structure; and multiplexing, as additional information, (i) a program description including a location information that designates a broadcast channel and broadcast time of each data program related to its identifier, and information about a hierarchical relationship between each data program and the host item, and (ii) a node description including information about a hierarchical relationship between each data program and the host item related to its identifier, into a data program, followed by broadcasting, wherein a plurality of program descriptions and node descriptions are divided into a plurality of groups, according to a distance between nodes in the hierarchical structure and information about to which group each program description and each node description belong, is multiplexed into a data program.

2. A data receiving apparatus for receiving a data program is multiplexed into a normal television program for broadcasting, by setting a common host item for a plurality of data programs, to create a hierarchical structure, and multiplexing, as additional information, (i) a program description including a location information that designates a broadcast channel and broadcast time of each data program related to its identifier, and information about a hierarchical relationship between each data program and the host item, and (ii) a node description including information about a hierarchical relationship between each data program and the host item related to its identifier, into a data program, followed by broadcasting, the data receiving apparatus including:

selection menu creating/displaying means in which, based on the node description and the program description, one of (i) an item selection menu screen capable of selecting one from host items, and (ii) a program selection menu screen capable of selecting one from data programs, is created and then displayed on a display screen, wherein said selection menu creating/displaying means divides the program descriptions and the node descriptions into a plurality of groups according to a distance between nodes in the hierarchical structure, to create a selection menu for each group; and data program receiving/displaying means in which a data program selected from the program selection menu screen is received via a broadcast and, based on the location information related to the data program, then displayed on a display screen.

* * * * *